Oct. 7, 1969    R. M. IRWIN    3,470,657
PORTABLE WELDING SHOP

Filed April 8, 1968    3 Sheets-Sheet 1

INVENTOR.
ROBERT M. IRWIN
BY Fulwider, Patton, Rieber,
Lee and Utecht
ATTORNEYS

Oct. 7, 1969   R. M. IRWIN   3,470,657
PORTABLE WELDING SHOP
Filed April 8, 1968   3 Sheets-Sheet 2
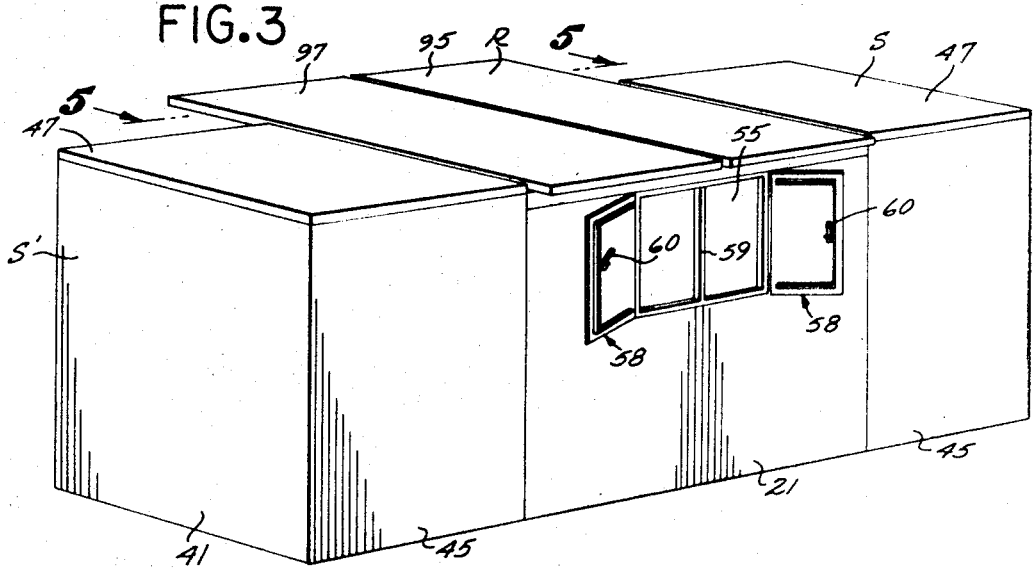
FIG. 3
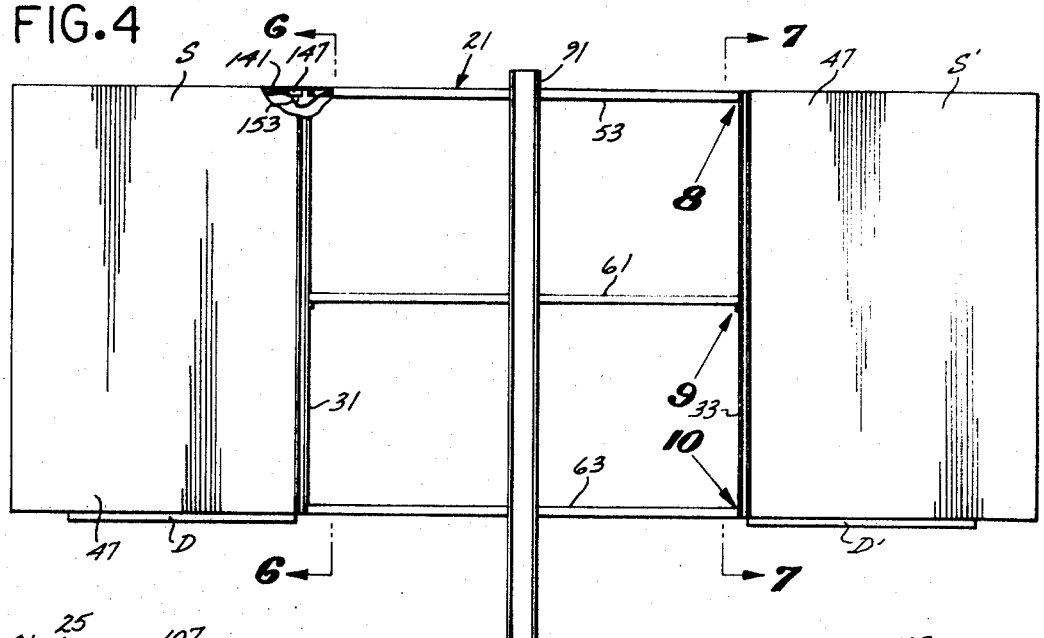
FIG. 4
FIG. 5
INVENTOR.
ROBERT M. IRWIN
BY Fulwider, Patton, Rieber,
Lee and Utecht
ATTORNEYS Oct. 7, 1969  R. M. IRWIN  3,470,657
PORTABLE WELDING SHOP
Filed April 8, 1968  3 Sheets-Sheet 3

INVENTOR.
ROBERT M. IRWIN
BY Fulwider, Patton, Rieber, Lee and Utecht
ATTORNEYS

United States Patent Office 3,470,657
Patented Oct. 7, 1969

3,470,657
PORTABLE WELDING SHOP
Robert M. Irwin, 3765 Gaviota,
Long Beach, Calif. 90807
Filed Apr. 8, 1968, Ser. No. 720,440
Int. Cl. E04h *14/00;* E04f *19/10*
U.S. Cl. 52—27    8 Claims

ABSTRACT OF THE DISCLOSURE

A portable welding shop including a pair of spaced-apart inwardly opening end sections having end, front and back walls, and roofs. A central back wall is removably connected on its opposite ends to the respective back walls of the end sections and a central roof portion spans the space between the end sections and is removably connected thereto on its ends. The central roof portion includes forwardly and rearwardly extending downwardly turned lips on its opposite ends, such lips being received in respective upwardly opening troughs formed by the end roofs included in the end sections. A pair of doors are hinged to the front walls of the end sections and cooperate to close the doorway formed between such front walls. The assembled welding shop forms a convenient closure for performing welding tasks and can be rapidly and easily disassembled for cartage from one location to another.

BACKGROUND OF THE INVENTION

Field of the invention

The present invention relates to rapidly constructable building construction.

Description of the prior art

There are no welding shops known to applicant that include spaced-apart end sections and a central roof portion removably connected on its opposite ends to the end sections and including forwardly and rearwardly extending downwardly-turned lips received in troughs formed by the roofs included in the end sections thereby forming a continuous roof over the entire shop.

SUMMARY OF THE INVENTION

The present invention is characterized by a pair of spaced-apart end sections forming closures with confronting open ends. A back wall and central roof portion are removably fastened to the end sections and such roof portion includes forwardly and rearwardly extending downwardly-turned lips on its opposite ends, such lips being received in forwardly and rearwardly extending troughs in the end sections to form an inter-locking seal.

An object of the present invention is to provide a portable welding shop that can be rapidly disassembled for convenient cartage.

Another object of the present invention is to provide a portable welding shop that is of sturdy construction and economical to manufacture.

Other objects and features of the present invention will become apparent from consideration of the following description taken in conjunction with the accompanying drawings.

DESCRIPTION OF THE DRAWINGS

FIG. 3 is a back perspective of the shop shown in FIG. 1;
FIG. 4 is a top view, partially broken away, of the welding shop shown in FIG. 1;
FIG. 5 is a partial longitudinal horizontal sectional view, in enlarged scale, taken along the lines 5—5 of FIG. 3.

DESCRIPTION OF PREFERRED EMBODIMENT

Figure 1:
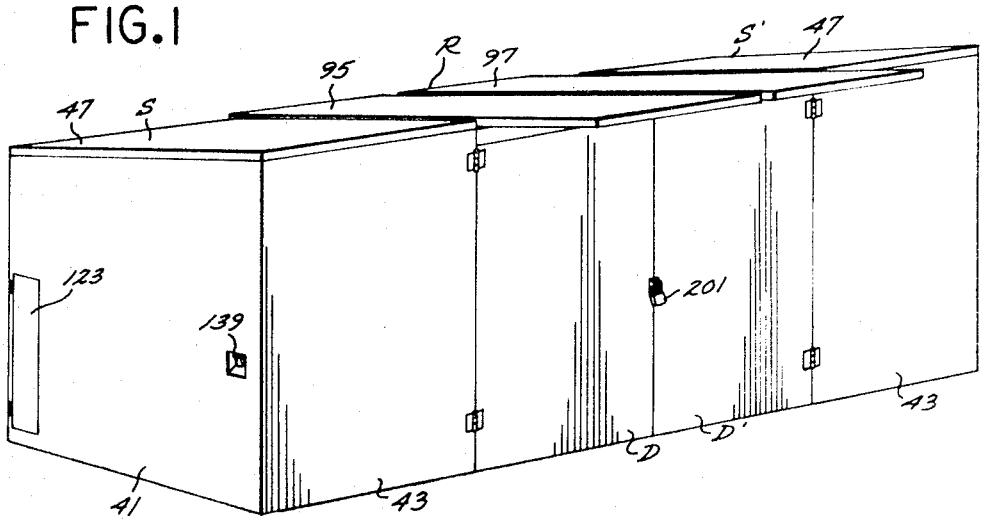
FIG. 1 is a front perspective view of a portable welding shop embodying the present invention.
Figure 2:
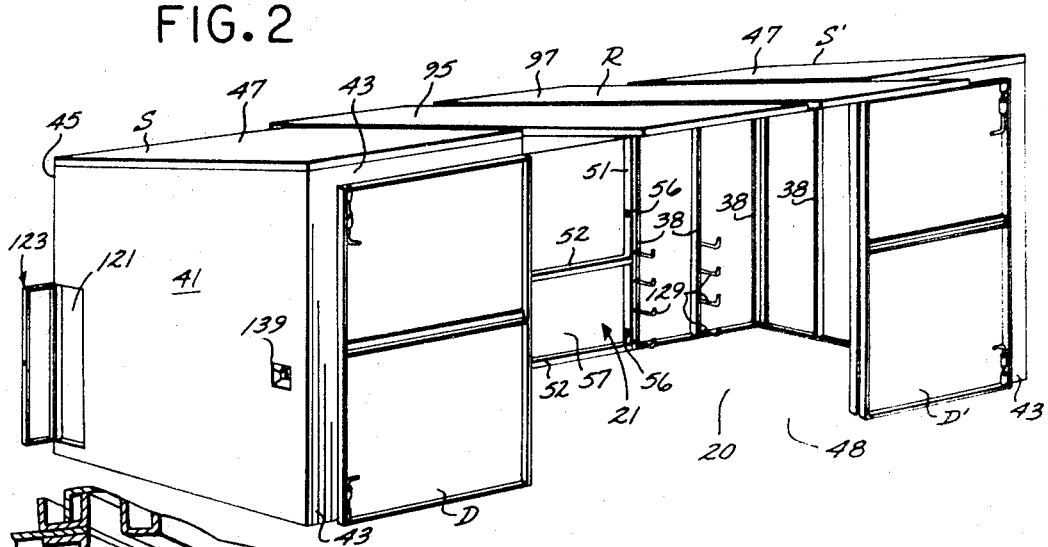
FIG. 2 is a perspective view similar to FIG. 1.

Referring to FIGS. 2, 3, and 5, the welding shop of present invention is generally of metal construction and includes a pair of end sections S and S' which have confronting open ends 20. A central back wall 21 is removably connected between the end sections S and S' and a central roof portion R is removably connected to the roof sections of the end sections S and S'. Referring to FIG. 5, the roof section R includes forwardly and rearwardly extending downwardly-turned lips 25 and 27 on its opposite ends, such lips being received in upwardly opening troughs or channels 31 and 33 in the respective sections S and S'.

Figure 6:
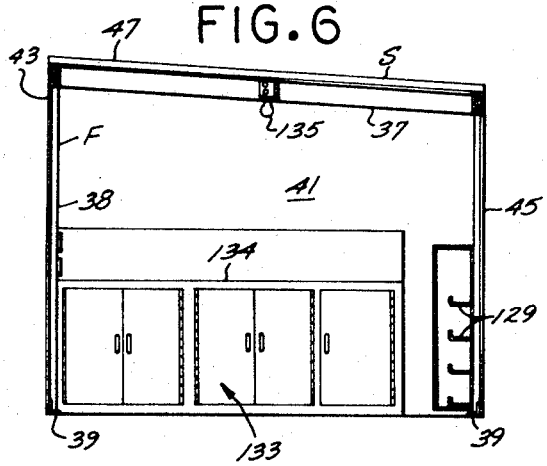
FIG. 6 is a transverse horizontal sectional view taken along the lines 6—6 of FIG. 4.

The sections S and S' are of similar construction and accordingly description thereof will be directed to the section S, it being understood that such description likewise pertains to the section S'. Referring to FIG. 6, the section S includes a frame F having forwardly inclined roof beams or channels 37, vertical wall studs 38 and base angles 39. The frame F is covered with an end panel 41, front wall 43, back wall 45, and a roof section 47. Referring to FIG. 2, doors D and D' are hingedly mounted from the front walls 43 of the sections S and S', respectively, for closing the doorway formed between such front walls.

Figure 11:
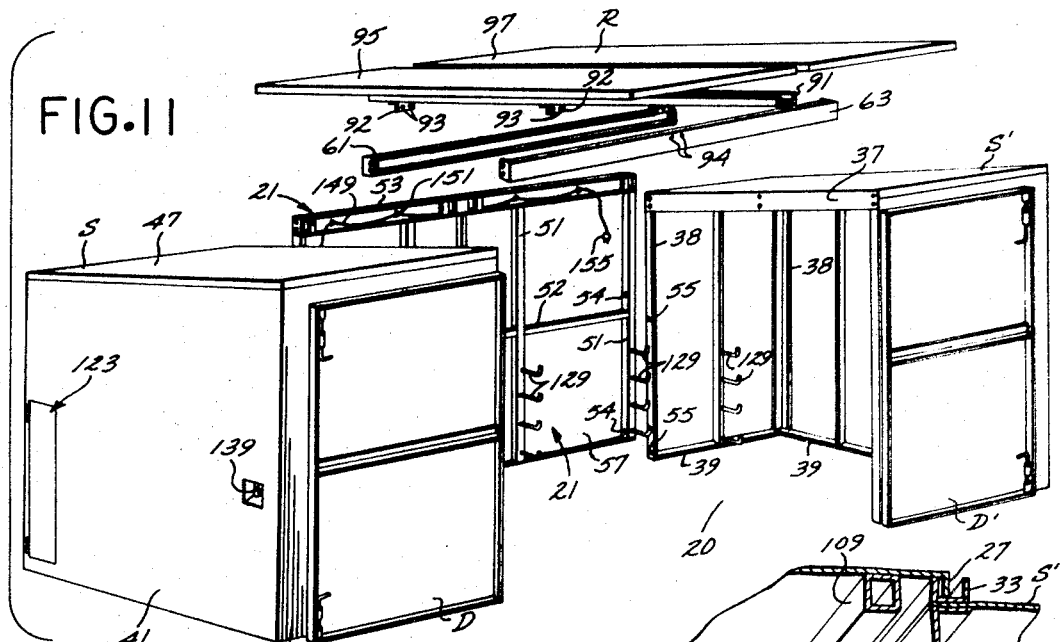
FIG. 11 is an exploded view of the welding shop shown in FIG. 1.

Referring to FIGS. 3 and 11, the central back wall 21 includes a frame comprised of vertical studs 51 and horizontal stiles 52 welded therebetween. A horizontal roof support beam 53 overlies the tops of the studs 51 and is connected thereto. The vertical studs 51, at each end of the back wall 21, include a plurality of vertically spaced-apart bores 54 for alignment with corresponding bores 55 in the frames of the respective sections S and S' to receive nut and bolt assemblies 56. A metal sheet 57 covers the studs 51 and stiles 52 to form the back wall 21. Referring to FIG. 3, a window opening is formed centrally in the wall 21 and is normally covered by a pair of hinged metal windows 58 that swing inwardly toward one another to latch at their proximate edges to latch elements (not shown) on a central post 59 by conventional cam latches 60.

Figure 10:
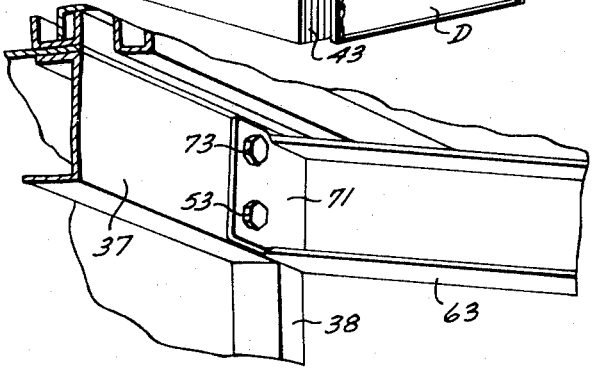
FIG. 10 is a partial interior perspective view, in enlarged scale, taken from the corner designated 10 in FIG. 4.
Figure 9:
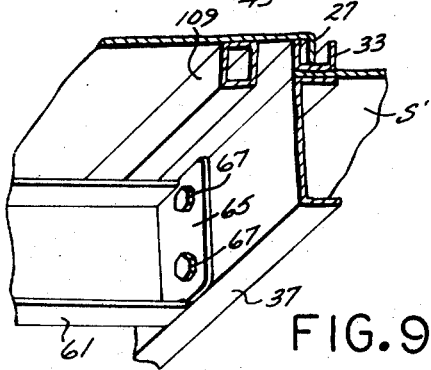
FIG. 9 is a partial interior perspective view, in enlarged scale, taken from the corner designated 9 in FIG. 4.

Referring to FIGS. 9, 10 and 11, three longitudinal roof support channels, or beams, 61, 63 and 53 extend between the roofs of sections S and S' and are fastened on their ends to the respective adjacent roof beams 37. With continued reference to FIG. 9, the channel 61 includes transverse webs 65 on its opposite ends which interfit the channel flanges and are welded thereto. The webs 65 lie flatly against the adjacent roof beams 37 and each includes a pair of bores for receiving nut and bolt assemblies 67 that extend through matching bores in the adjacent beams 37 to support the channel 61. Referring to FIG. 10, the beam 63 also includes transverse webs 71 on its opposite ends which lie against the adjacent channels 37 and are secured thereto by bolts 73.

Figure 8:
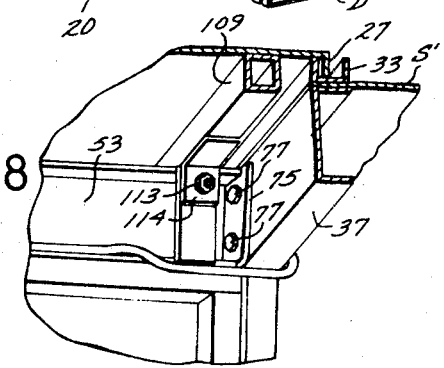
FIG. 8 is a partial interior perspective view, in enlarged scale, taken from the corner designated 8 in FIG. 4.

Referring to FIG. 8, the back wall roof beam 53 also includes transverse flanges 75 on its opposite ends for abutting the respective adjacent forwardly and rearwardly extending roof beams 37 and which receive mounting bolts 77 that connect the beam 53 to the beam 37.

Referring to FIG. 4, an upwardly opening, front to rear extending, channel 91 overlies the central portion of the roof beams 53, 61 and 63 and projects forwardly beyond the front wall of the shop. As best seen in FIG. 11, the channel 91 has three relatively short transverse angles 92 welded to its underside in spaced relation for mating with the respective beams 53, 61 and 63, such angles including a pair of bores 93 in their vertically extending legs for receiving nut and bolt assemblies which extend through mating bores 94 in the roof beams 53, 61 and 63 to secure the channel 91 thereto. The roof portion R overlies the beams 53, 61 and 63 and is formed by a pair of side by side panels 95 and 97, the remote marginal edges of which form the aforementioned forwardly and rearwardly extending lips 25 and 27 (FIG. 5) which project into the channels 31 and 33 respectively. The proximate marginal edges of the panels 95 and 97 are turned donwardly to form forwardly and rearwardly extending lips 101 and 103 (FIG. 5) which interfit the channel 91 to cooperate therewith in forming a seal. With continued reference to FIG. 5, forwardly and rearwardly extending support ribs 107 and 109 are welded to the underside of the panels 95 and 97 respectively and have a plurality of mounting clips 111 and 113 secured thereto for fastening the remote edges of the roof portion R to the beams 53, 61 and 63 by nut and bolt assemblies 114. The panels 95 and 97 project beyond the front of the shop to form an awning in front of the doorway.

Referring to FIGS. 2 and 11, the end wall 41 of the section S includes an auxiliary doorway 121 and an auxiliary door generally designated 123 for covering such doorway. A plurality of hangers 129 are in alignment with the doorway 121 and are mounted interiorly on the back walls 45 of the sections S and S' and on the central back wall 21 whereby long pipes and rods may be entered through the doorway 121 and stored on such hangers.

A clothes locker 132 (FIG. 7) is built in the section S' for receiving workmen's clothes and a set of tool cabinets 133 (FIG. 6) is built in the section S and the top 134 thereof forms a work bench.

Figure 7:
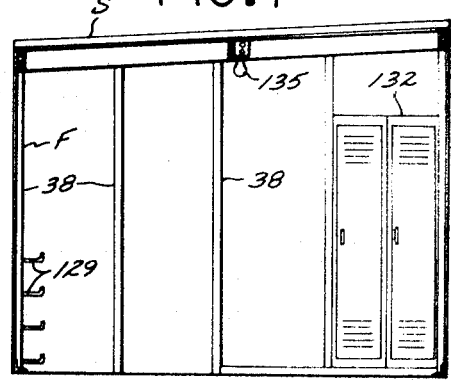
FIG. 7 is a transverse horizontal sectional view taken along the lines 7—7 of FIG. 4.

Referring to FIGS. 2, 6 and 7, the end sections S and S' have lighting fixtures 135 mounted on the roofs thereof and include electrical sockets (not shown). Electricity is provided to the fixtures 135 by means of electrical circuitry including a connector fitting 139 (FIG. 11) mounted in the end wall 41 and facing outwardly therefrom for receiving a mating connector (not shown) leading from an electrical source. A lead 141 (FIG. 4) extends from the connector 139 along the end wall 41 and then along the back wall 45 to a socket 147 mounted thereon. With continued reference to FIG. 11, an insulated electrical wire 149 extends across the upper portion of the back wall 21 and is affixed thereto by a plurality of fasteners 151. The wire 149 includes a plug 153 on one end for mating with the socket 147 and a second plug 155 on the opposite end for mating with a similar socket (not shown) mounted on the back wall 45 of section S' and connected with the light 135 mounted on the roof 47 of the section S'.

In operation, the welding shop of present invention is assembled by bringing the end sections S and S' into spaced-apart position to accept the central back wall 21, bringing the back wall 21 into position and inserting the connecting bolts 56 through the bores 54 and 55 to secure the back wall to such end sections. The bolts 77 are then inserted in the flanges 75 at the opposite ends of the back wall beam 53 to secure it to the beams 37. The roof beams 61 and 63 are then brought into position and the supporting bolts 67 and 73 inserted through the respective flanges 65 and 71 and beams 37 to secure the beams 61 and 63 in position. The central channel 91 is then placed over the roof beams 53, 61 and 63 and the connecting bolts inserted through the transverse angles 92 to secure the channel 91 in position. The roof panels 95 and 97 are then placed in position overlying the beams 53, 61 and 63 with the lips 25 and 27 interposed in the respective channels 31 and 33 and the lips 101 and 103 disposed in the channel 91 thereby sealing the roof against leakage. The panels 95 and 97 are secured in position by the mounting bolts 114 being inserted through the respective brackets 111 and 113 and the associated roof beams. The electrical plugs 153 and 155 are then mated with the respective sockets and the lead from the power source (not shown) connected with the connector 139.

The welding shop can then be utilized to carry on welding functions therein and the cabinets 133 utilized for storage of welding paraphernalia and the bench top 134 utilized for holding work and tools. The lockers 132 can be utilized for storage of coveralls and the like. It is of particular importance that the door 123 can be opened for insertion of long rods and pipes for storage on the hangers 129. After the long pipes and rods have been stored on the hangers 129, the door 123 can be locked from the inside of the welding shop and windows 38 likewise locked to prevent access thereto by unauthorized personnel. The doors D and D' can also be swung to their closed position and a padlock 201 installed to prevent theft of the stored material.

When it is desirable to move the welding shop to a new location, the roof bolts 114 are removed and the panels 95 and 97 lifted from the channels 31, 91 and 33. The beams 61 and 63 are then removed, and the central back wall 21 disconnected from the end sections S and S'. The entire welding shop can then be loaded on one truck and conveyed to a new location for reassembly.

From the foregoing it will be apparent that the welding shop of present invention is of extremely sturdy construction and economical to build. The welding shop can be conveniently disassembled for cartage on a relatively small truck and can readily be reassembled at a new location.

Various modifications and changes may be made with regard to the foregoing detailed description.

I claim:
1. A portable welding shop comprising:
   a pair of spaced-apart end sections including end, front and back walls, said end sections having confronting open ends and including roof sections formed with forwardly and rearwardly extending, upwardly opening, troughs adjacent said open ends, the proximate edges of said front walls defining a doorway, including doors for closing said doorway;
   a central back wall extending between said back walls of said end sections;
   means for removably fastening said central back wall to said end sections;
   a central roof portion spanning the distance between said roof sections and including a first pair of downwardly turned forwardly and rearwardly extending lips projecting into said respective troughs and cooperating therewith to form a seal;
   means for removably fastening said central roof portion to said end sections.

2. A portable welding shop as set forth in claim 1 that includes:
   beams connecting said roof sections together;
   a forwardly and rearwardly extending, upwardly opening channel supported centrally on said beams; and
   wherein said central roof portion includes first and second panels, said panels including a second pair of forwardly and rearwardly extending, downwardly turned lips projecting into said channel and cooperating therewith to form a seal.

3. A portable welding shop as set forth in claim 1 wherein said back walls included in said respective end sections include:
   a plurality of pairs of horizontally aligned hangers; and
one of said end walls includes:
   an auxiliary door opening aligned with said hangers; and
   an auxiliary door hingedly depending from said one end wall for closing said auxiliary door opening.

4. A portable welding shop as set forth in claim 3 wherein said central back wall includes:
   a plurality of hangers aligned with the respective pairs of hangers.

5. A portable welding shop as set forth in claim 1 that includes electrical circuitry including:
   an electrical inlet fitting mounted in one of said end sections, a first socket mounted in said one end section and a second socket mounted in the other of said end sections, an electrical lead connecting said fitting with said first socket, a second electrical lead extending along said back wall and affixed thereto, said second lead including a first plug on one end for mating with said first socket, and a second plug on the opposite end thereof for connection with said second socket.

6. A portable welding shop as set forth in claim 5 that includes:
   beams connecting said roof sections together;
   a forwardly and rearwardly extending, upwardly opening channel supported centrally on said beams; and wherein said central roof portion includes first and second panels, said panels including a second pair of forwardly and rearwardly extending, downwardly turned lips projecting into said channel and cooperating therewith to form a seal.

7. A portable welding shop as set forth in claim 5 wherein said back walls in said end sections include:
   a plurality of pairs of horizontally aligned hangers; and
   one of said end walls includes:
   an auxiliary door opening aligned with said hangers; and
   an auxiliary door hingedly depending from said one end wall for closing said auxiliary door opening.

8. A portable welding shop as set forth in claim 1 wherein said central roof portion projects forwardly beyond the plane of said front walls to form an awning.

References Cited

UNITED STATES PATENTS

| | | | |
|---|---|---|---|
| 954,305 | 4/1910 | Kimbell | 52—79 |
| 1,156,693 | 10/1915 | Koger | 52—79 X |
| 2,952,799 | 9/1960 | Wortman et al. | 52—284 X |
| 3,054,481 | 9/1962 | Johnson et al. | 52—27 X |
| 3,336,705 | 8/1967 | Vecchiarelli et al. | 52—497 X |

FRANK L. ABBOTT, Primary Examiner

P. C. FAW, Jr., Assistant Examiner

U.S. Cl. X.R.

52—73, 79, 210, 470, 519